Feb. 13, 1934.   O. WITTEL   1,946,605

MOTION PICTURE FILM MAGAZINE

Filed June 21, 1932

Inventor:
Otto Wittel,
By Newton M. Perrins
George A. Gillette, Jr.
Attorneys

Patented Feb. 13, 1934

1,946,605

UNITED STATES PATENT OFFICE 1,946,605

MOTION PICTURE FILM MAGAZINE

Otto Wittel, Rochester, N. Y., assignor to Eastman Kodak Company, Rochester, N. Y., a corporation of New York Application June 21, 1932. Serial No. 618,455

10 Claims. (Cl. 88—17)

The present invention relates to a motion picture film magazine and more particularly to a film magazine in which the film is exposed at a gate provided in one edge of the magazine.

In this type of magazine a loop or some equivalent means for permitting intermittent advancement of the film through the gate must be provided. The objection to providing a free loop within the magazine is that the dimensions of the magazine are materially increased because space must be provided for a sprocket or a similar element. On the other hand, if the sprocket is eliminated, then the take-up will tend to pull the film past the gate opening during exposure.

The primary object of the present invention is the provision in combination with a film advancing mechanism and a friction take-up, of a film magazine containing a duct and a snubbing means therein so provided that film may be pushed through the duct by the advancing means but cannot be pulled through the duct by the take-up.

Another object of the present invention is the provision of a film magazine containing a duct and snubbing members in stagggered relation within the duct to prevent pulling of the film through the duct and past the gate aperture.

A further object of the invention is the provision of a film magazine having a duct in which plano-convex snubbing members are located in staggered spaced relation to form the film into a sinuous path in its passage through the duct, the walls of the duct permitting increase in the length of the sinuous path without increase in the amplitude thereof.

Still another object of the present invention is the provision of a film magazine having a flat wall extending around the edges of the magazine and containing a flat guide plate located in spaced relation to the wall of the magazine to form a duct for the film and the provision of semi-cylindrical snubbing members in staggered relation within the duct and mounted alternatively upon the wall of the magazine and the flat guide plate.

Other objects of the invention will be apparent to those skilled in the art as the disclosure of my invention is developed hereinafter.

Reference is hereby made to the acocmpanying drawing in which similar elements are designated by similar reference numerals and in which.

Figure 1:
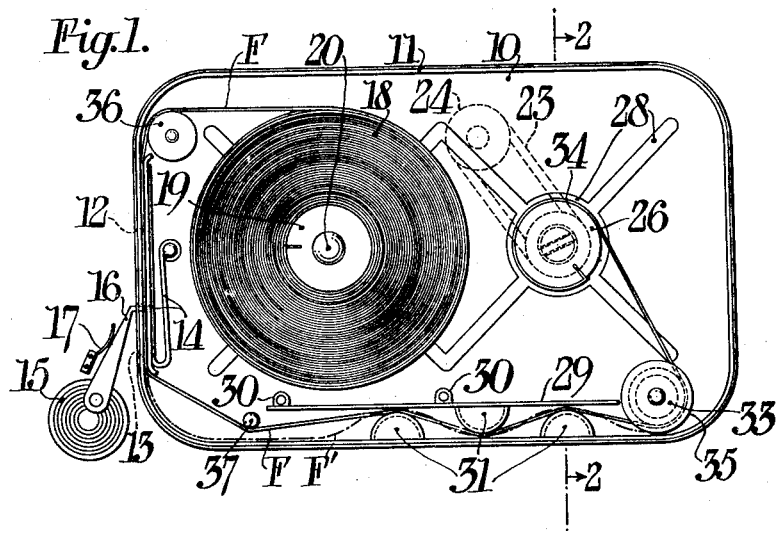
Fig. 1 is a side elevation of the motion picture film magazine according to the invention and having one cover removed.

The cover 10 of the magazine is provided with a wall 11 which extends around the edges of cover 10. The wall 11 is provided at the front edge of the magazine with a gate opening 12 and an elongated slot 13. A presser member 14 is resiliently held against the front portion of wall 11 and is adapted to hold film in a flat plane across the gate opening 12.

A film advancing mechanism of the claw type is provided for intermittent movement of the film past the gate opening 12. This film advancing mechanism may be of any known type including a claw and is illustrated in Fig. 1 as being composed of a disk 15 and a claw 16 which is eccentrically pivoted to disk 15 and which is resiliently held by a spring 17 within elongated slot 13 to engage the film perforations.

The film is furnished to the magazine in the form of a supply film roll 18 which is wound upon a core 19 adapted to be rotatably supported by spindle 20. The take-up for the film is of the friction type which will rotate the take-up core to wind film thereon and to create a tension in the film corresponding to the friction of the take-up. By way of example, the take-up has been illustrated as comprising a take-up spindle 21, see Fig. 2, which carries a pulley 22. The pulley 22 may be rotated by a spring belt 23 which also encircles a pulley 24 or other suitable prime mover. This type of friction drive in which slipping occurs between the spring belt and the pulleys is well known in the art and may be replaced by any other type of friction take-up which will function in the same manner for the take-up of film.

Figure 2:
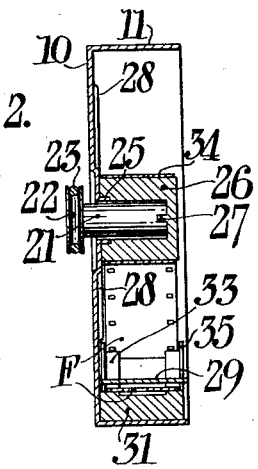
Fig. 2 is a vertical cross-section of the film magazine according to the invention and is taken on the line 2—2 of Fig. 1.

As shown in Fig. 2, an annular flange 25 is formed out of cover 10 and is adapted to rotatably support a core 26. The take-up spindle 21 enters the magazine through the annular flange 25 and engages a key 27 or other suitable engaging means on the interior of core 26. Embossings 28 are also formed up out of the cover 10 and are adapted to engage the edges of the film for guiding the same with minimum frictional resistance.

The film magazine as thus far described is of conventional form and well-known in the art. Such a magazine, however, is open to the objection that the take-up often causes unsteadiness of film exposure because it sometimes pulls the film across the gate aperture 12 when the shutter of the camera is open. Furthermore, the take-up acts so rapidly upon the slack film provided by the film advancing mechanism that there is a loud slapping between the layers of film on the take-up. The objections just mentioned may be overcome by increasing the pressure and frictional resistance on the film at the gate. However, such increase in pressure and frictional resistance at the gate will require a pull-down of much greater strength.

The present invention provides for intermittently increased frictional resistance to the movement of the film from the gate to the take-up which is created by snubbing means within a duct through which the film passes. A plurality of plano-convex snubbing members are provided in staggered spaced relation within such a duct which is formed by the location of a guide member 29 in spaced relation to wall 11 of the magazine and attached to the cover 10 by a pair of lugs 30. Semi-cylindrical snubbing members 31, see Fig. 1, are alternatively attached to wall 11 and guide member 29 and have flat sides abutting said wall 11 and guide member 29.

Figure 3:
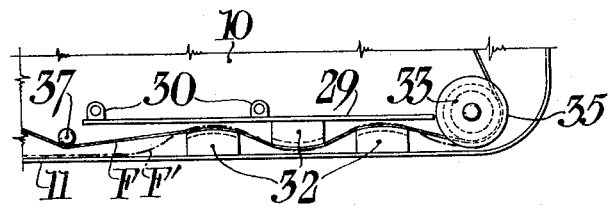
Fig. 3 is a fragmentary side elevation of a modified form of the snubbing members located in staggered relation within the duct of the magazine.

If the snubbing action or frictional resistance between the snubbing members and the film is not of sufficient magnitude such action or resistance may be increased by decreasing the curvature of the contact surfaces on the snubbing members. In Fig. 3 a plurality of snubbing members 32 are located in staggered relation within the duct of the magazine formed by guide member 29 and wall 11. Snubbing members 32 have three flat surfaces and one curved surface but are still included within the broad term plano-convex snubbing members.

A guide post 33 is located in one corner of the magazine and is adapted to guide the film from the duct to the take-up film roll 34 on core 26. A flange 35 is attached to one end of guide post 33 and guides the edges of the film in its path around post 33. The guide post 33, snubbing members 31, and modified snubbing members 32 are all undercut so as to engage only the margins of the film. This is best illustrated in the lower part of Fig. 2.

The path of the film F through the magazine will now be described. The film F is unwound from the supply film roll 18, passes over a roller 36 rotatably mounted above the gate, passes between the front wall 11 of the magazine and the presser member 14 for exposure through gate opening 12, is intermittently moved by claw 16 which engages the film perforations through elongated slot 13, passes around stud 37 at the entrance to the duct, is conducted in a sinuous path through the duct formed between guide members 29 and the wall 11 of the magazine in frictional engagement or snubbing relation with respect to the plurality of snubbing members, passes around guide post 33 and is wound upon take-up film roll 34 by the frictional take-up means previously described. The profile of the film F at the beginning of the stroke of the film advancing mechanism is illustrated by a solid line in Figs. 1 and 3, and it will be noted that this profile of the film through the duct in contact with the snubbing members is of sinuous formation. The profile of the film from the gate to the take-up immediately after the completion of a pull-down stroke is illustrated by the dash-dot line F'. The length of film advanced is now contained within the duct and the sinuous profile of the film has been somewhat altered without any increase in amplitude. The alteration in the sinuous film profile by increasing its length without increasing its amplitude results in less curvature at the nodes of the path so that there is less snubbing action or frictional resistance between the snubbing members and the film. This permits the frictional take-up to draw the film through the duct until the nodes of the sinuous profile again make greater frictional engagement with the surfaces of the snubbing members to overcome the drive of the take-up.

The provision of cylindrical snubbing members between the gate and the take-up mechanism of a film magazine is known. However, these snubbing members have heretofore been used without cooperation of a duct so that the various snubbing actions between the film and the snubbing members have become effective successively and not uniformly as in the magazine of the invention. In other words, the location of the snubbing members within a duct prevents increase in the amplitude of the sinuous film path so that the nodes of the film are flattened and the film may be moved longitudinally through the sinuous path without materially increasing any one snubbing action or frictional engagement of one snubbing member with the film ahead of any of the others.

Since many modifications of the film magazine according to the invention may be devised without exceeding the ambit of the invention, the present disclosure is to be construed in an illustrative and not in a limited sense.

Having now particularly described my invention, what I desire to secure by Letters Patent of the United States and what I claim is:

1. In a motion picture apparatus, the combination with a film magazine, a duct within said magazine adapted to guide a film, and snubbing means within said duct adapted frictionally to engage said film, of a film advancing mechanism adapted intermittently to push said film into said duct and a film take-up frictionally driven and adapted to pull from said duct a length of film corresponding to that fed into said duct by said advancing means.

2. In a motion picture apparatus, the combination with a film magazine, a duct within said magazine adapted to guide a film, and snubbing means within said duct adapted frictionally to engage said film, of a film advancing mechanism adapted intermittently to push said film into said duct and to move the same away from said snubbing means, and a film take-up frictionally driven and adapted to pull a length of film from said duct equal to the length of film pushed into the duct by said film advancing mechanism.

3. In a motion picture apparatus, the combination with a film magazine, a duct within said magazine adapted to guide a film, and a plurality of snubbing members in staggered space relation within said duct and adapted frictionally to engage said film at intervals, of a film advancing mechanism adapted intermittently to push said film into said duct and into engagement with the walls of said duct, and a film take-up frictionally driven and adapted to pull said film from the duct and to move the film into snubbing relation to said snubbing members.

4. In a motion picture apparatus, the combination with a film magazine, a duct within said magazine adapted to guide a film, and a plurality of snubbing members in staggered space relation within said duct and adapted to bend said film into a sinuous path within said duct, of a film advancing mechanism adapted intermittently to push said film into said duct and to increase the length of said sinuous path, said duct being adapted to prevent increase in the amplitude of said sinuous path, and a friction driven take-up adapted to pull said film from the duct, to decrease the length of the sinuous path of said film and to move the film into snubbing relation to said snubbing members.

5. In a motion picture apparatus, the combination with a film magazine, a duct within said magazine having rigid walls adapted to guide a film, and a plurality of snubbing members mounted in staggered space relation on the walls of said duct and adapted to curve said film into a sinuous path within said duct, of a film advancing mechanism adapted intermittently to push said film into said duct and to increase the length of said sinuous path, the rigid walls of said duct being adapted to prevent increase in the amplitude of said sinuous path, and a friction driven take-up adapted to pull said film from the duct, to decrease the length of the sinuous path of said film and to move the film into snubbing relation to said snubbing members.

6. In a film magazine adapted to contain a pair of film rolls, the combination with a duct adapted to guide the film in its path from one film roll to the other, of snubbing means within said duct, adapted to make frictional engagement with said film and to prevent movement of the film through said duct.

7. In a film magazine adapted to contain a pair of film rolls, the combination with a duct adapted to guide the film in its path from one film roll to the other, of a plurality of snubbing members in staggered space relation within said duct, adapted to make frictional engagement with said film and to prevent movement of the film through said duct.

8. In a film magazine adapted to contain a pair of film rolls, the combination with a rigid guide member in spaced relation to the wall of the magazine and forming a duct adapted to guide film in its path from one film roll to the other, of a plurality of snubbing members mounted in staggered space relation on said guide members and the wall of the magazine, adapted to make frictional engagement with said film and adapted to prevent film from being pulled through said duct.

9. In a film magazine adapted to contain a pair of film rolls, the combination with a wall extending around the edge of said magazine and a guide member rigidly mounted in spaced relation to said wall to form a duct adapted to contain the film in its path from one film roll to the other, of a plurality of plano-convex snubbing members mounted alternately on said wall and said guide member with the convex surfaces alternately in spaced relation to the wall and the guide member.

10. In a film magazine adapted to contain a pair of film rolls, the combination with a wall extending around the edge of said magazine and a guide member rigidly mounted in spaced relation to said wall to form a duct adapted to contain the film in its path from one film roll to the other, of a plurality of semi-cylindrical snubbing members having flat sides and alternately mounted on said wall and said guide member, the cylindrical surfaces of the snubbing members on said wall being spaced from said guide member and the cylindrical surfaces of the snubbing members on said guide members being spaced from said wall.

OTTO WITTEL.